(12) United States Patent
Terry et al.

(10) Patent No.: US 9,258,096 B2
(45) Date of Patent: *Feb. 9, 2016

(54) METHOD AND SYSTEM FOR SUPPORTING MULTIPLE HYBRID AUTOMATIC REPEAT REQUEST PROCESSES PER TRANSMISSION TIME INTERVAL

(71) Applicant: INTERDIGITAL TECHNOLOGY CORPORATION, Wilmington, DE (US)

(72) Inventors: Stephen E. Terry, Northport, NY (US); Robert L. Olesen, Huntington, NY (US); Jin Wang, Princeton, NJ (US); Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,880

(22) Filed: Aug. 25, 2014

(65) Prior Publication Data

US 2014/0362833 A1 Dec. 11, 2014

Related U.S. Application Data

(63) Continuation of application No. 14/082,986, filed on Nov. 18, 2013, now Pat. No. 8,819,514, which is a continuation of application No. 13/735,515, filed on Jan. 7, 2013, now Pat. No. 8,589,753, which is a (Continued)

(51) Int. Cl.
*H04L 1/18* (2006.01)
*G08C 25/02* (2006.01)
(Continued)

(52) U.S. Cl.
CPC ............ *H04L 5/0053* (2013.01); *H04L 1/1607* (2013.01); *H04L 1/1812* (2013.01);
(Continued)

(58) Field of Classification Search
CPC ... H04L 1/1607; H04L 5/0055; H04L 1/1887; H04L 1/1812; H04W 72/042
USPC .................................. 714/748–751; 370/474
See application file for complete search history.

(56) References Cited

U.S. PATENT DOCUMENTS 6,021,124 A 2/2000 Haartsen
6,421,803 B1 7/2002 Persson et al.
(Continued)

FOREIGN PATENT DOCUMENTS

CN 1464677 A 12/2003
CN 1731771 A 2/2006
(Continued)

OTHER PUBLICATIONS

Aniba et al., "Adaptive Proportional Fairness for Packet Scheduling in HSDPA", Global Telecommunications Conference, 2004, GLOBECOM, vol. 6, pp. 4033-4037, (Nov. 29-Dec. 3, 2004).
(Continued)

*Primary Examiner* — Guy Lamarre
(74) *Attorney, Agent, or Firm* — Volpe and Koenig, P.C.

(57) ABSTRACT

A method and apparatus may be used for supporting multiple hybrid automatic repeat request (H-ARQ) processes per transmission time interval (TTI). A transmitter and a receiver may include a plurality of H-ARQ processes. Each H-ARQ process may transmit and receive one TB per TTI. The transmitter may generate a plurality of TBs and assign each TB to a H-ARQ process. The transmitter may send control information for each TB, which may include H-ARQ information associated TBs with the TBs. The transmitter may send the TBs using the associated H-ARQ processes simultaneously per TTI. After receiving the TBs, the receiver may send feedback for each of the H-ARQ processes and associated TBs indicating successful or unsuccessful receipt of each of the TBs to the transmitter. The feedback for multiple TBs may be combined for the simultaneously transmitted H-ARQ processes, (i.e., TBs).

70 Claims, 2 Drawing Sheets

Related U.S. Application Data continuation of application No. 13/309,713, filed on Dec. 2, 2011, now Pat. No. 8,352,824, which is a continuation of application No. 11/670,202, filed on Feb. 1, 2007, now Pat. No. 8,074,137.

(60) Provisional application No. 60/839,462, filed on Aug. 23, 2006, provisional application No. 60/765,076, filed on Feb. 3, 2006.

(51) Int. Cl.
    *H04L 5/00*     (2006.01)
    *H04L 1/16*     (2006.01)
    *H04W 72/04*     (2009.01)

(52) U.S. Cl.
    CPC ............ *H04L1/1887* (2013.01); *H04L 5/0055* (2013.01); *H04W 72/042* (2013.01); *H04W 72/0446* (2013.01)

(56) References Cited

U.S. PATENT DOCUMENTS

| | | | |
|---|---|---|---|
| 6,658,005 | B2 | 12/2003 | Seidel et al. |
| 6,977,888 | B1 | 12/2005 | Frenger et al. |
| 7,075,917 | B2 | 7/2006 | Herrmann |
| 7,287,206 | B2 | 10/2007 | Terry et al. |
| 7,379,746 | B2 | 5/2008 | Lee et al. |
| 7,392,460 | B2 | 6/2008 | Kim et al. |
| 7,447,968 | B2 | 11/2008 | Ha et al. |
| 7,508,804 | B2 | 3/2009 | Das et al. |
| 7,590,181 | B2 | 9/2009 | Awad et al. |
| 7,640,486 | B2 | 12/2009 | Dottling et al. |
| 7,924,785 | B2 | 4/2011 | Shaheen et al. |
| 8,270,345 | B2 | 9/2012 | Franceschini et al. |
| 8,819,514 | B2 * | 8/2014 | Terry et al. .................. 714/748 |
| 2002/0159431 | A1 | 10/2002 | Moulsley et al. |
| 2003/0074476 | A1 | 4/2003 | Kim et al. |
| 2003/0086391 | A1 | 5/2003 | Terry et al. |
| 2003/0147371 | A1 | 8/2003 | Choi et al. |
| 2003/0152062 | A1 | 8/2003 | Terry et al. |
| 2003/0153276 | A1 | 8/2003 | Terry et al. |
| 2004/0037224 | A1 | 2/2004 | Choi et al. |
| 2004/0152458 | A1 | 8/2004 | Hottinen |
| 2004/0185785 | A1 | 9/2004 | Mir et al. |
| 2004/0190523 | A1 | 9/2004 | Gessner et al. |
| 2004/0199846 | A1 | 10/2004 | Matsumoto et al. |
| 2005/0063345 | A1 | 3/2005 | Wu et al. |
| 2005/0063347 | A1 | 3/2005 | Sarkkinen et al. |
| 2005/0105494 | A1 | 5/2005 | Kim et al. |
| 2005/0128993 | A1 | 6/2005 | Yu et al. |
| 2005/0152310 | A1 | 7/2005 | Rudolf et al. |
| 2005/0219999 | A1 | 10/2005 | Kim et al. |
| 2005/0276266 | A1 | 12/2005 | Terry |
| 2006/0013161 | A1 | 1/2006 | Suzuki |
| 2006/0034240 | A1 | 2/2006 | Kwak et al. |
| 2006/0092972 | A1 | 5/2006 | Petrovic et al. |
| 2006/0128309 | A1 | 6/2006 | Dateki et al. |
| 2006/0209813 | A1 | 9/2006 | Higuchi et al. |
| 2007/0255993 | A1 | 11/2007 | Yap et al. |
| 2008/0052591 | A1 * | 2/2008 | Terry et al. .................. 714/748 |

FOREIGN PATENT DOCUMENTS

| | | |
|---|---|---|
| EP | 1 389 848 | 2/2004 |
| JP | 09-247132 | 9/1997 |
| WO | 03/036844 | 5/2003 |
| WO | 03/069818 | 8/2003 |
| WO | 03/094554 | 11/2003 |
| WO | 2004/015906 | 2/2004 |
| WO | 2004/102863 | 11/2004 |
| WO | 2005/109729 | 11/2005 |
| WO | 2005/112327 | 11/2005 |
| WO | 2005/112331 | 11/2005 |

OTHER PUBLICATIONS

Das et al., "Evolution of UTMS Toward High-Speed Downlink Packet Access", Bell Labs Technical Journal, vol. 7, No. 7, pp. 47-68, (Mar. 4, 2003).

Ericsson et al., *Text Proposal on Adaptive Modulation and Channel Coding Rate Control for Frequency Domain Scheduling in Evolved UTRA Downlink*, TSG-RAN WG1 #43, R1-051307, (Seoul, Korea Nov. 7-11, 2005).

Forket et al., *High Speed Downlink Packet Access* (HSDPA)—*Enhanced Data Rates for UMTS Evolution*, Computer Networks, Elsevier Science Publisher B.V., vol. 49, No. 3, pp. 325-340, (Oct. 19, 2005).

IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Std. 802.16e-2005 (Feb. 2006).

Lucent Technologies, "L2/L3 MIMO Aspects," TSG-RAN Working Group 2 Meeting #43, R2041550 (Aug. 16-20, 2004).

Lucent Technologies, "Signalling Support for Multiple Simultaneous Transmissions to a UE within a TTI," TSG-RAN WG1 and WG2 Adhoc on HSDPA, 12A010055 (Nov. 5-7, 2001).

Lundevall et al., "Streaming Applications Over HSDPA in Mixed Service Scenarios", 2004 IEEE 60$^{th}$ Vehicular Technology Conference, 2004, VTC2004-Fall., vol. 2, pp. 841-845, (Sep. 26-29, 2004).

Nortel Networks, "Discussion on ARQ aspects for High Speed Downlink Packet Access," TSG-RAN Working Group1 meeting #17, TSGR1#17(00)1442 (Nov. 21-24, 2000).

Siemens, "Signaling methods for Hybrid ARQ Type II/III," 3GPP TSG RNA WG1 #12, R1-00-0514 (Apr. 10-13, 2000).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.4.0 (Jan. 2007).

Third Generation Partnership Project, "Technical Specification Group Radio Access Network; Physical Channels and Modulation (Release 8)," 3GPP TS 36.211 V0.2.2 (Dec. 2006).

Third Generation Partnership Project, "Technical Specification Group Radio Access Network; Physical layer procedures (Release 8)," 3GPP TS 36.213 V0.2.0 (Oct. 2006).

Third Generation Partnership Project, "Technical Specification Group Radio Access Network; Multiplexing and channel coding (Release 8)," 3GPP TS 36.212 V0.2.1 (Nov. 2006).

Third Generation Partnership Project, "Technical Specification Group Radio Access Network; Multiplexing and channel coding (FDD) (Release 7)," 3GPP TS 25.212 V7.3.0 (Dec. 2006).

Third Generation Partnership Project, "Technical Specification Group Radio Access Network; Multiplexing and channel coding (FDD) (Release 6)," 3GPP TS 25.212 V6.10.0 (Dec. 2006).

Third Generation Partnership Project, "Technical Specification Group Radio Access Network; Multiplexing and channel coding (FDD) (Release 6)," 3GPP TS 25.212 V6.7.0 (Dec. 2005).

Third Generation Partnership Project, "Technical Specification Group Radio Access Network; Multiplexing and channel coding (FDD) (Release 5)," 3GPP TS 25.212 V5.10.0 (Jun. 2005).

Third Generation Partnership Project, "Technical Specification Group Radio Access Network; High Speed Downlink Packet Access (HSDPA); Overall description; Stage 2 (Release 7)," 3GPP TS 25.308 V7.1.0 (Dec. 2006).

Third Generation Partnership Project, "Technical Specification Group Radio Access Network; High Speed Downlink Packet Access (HSDPA); Overall description; Stage 2 (Release 6)," 3GPP TS 25.308 V6.3.0 (Dec. 2004).

Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).

Third Generation Partnership Project, "Technical Specification Group Radio Access Network; Physical layer procedures (FDD) (Release 7)," 3GPP TS 25.214 V7.3.0 (Dec. 2006).

(56) References Cited

OTHER PUBLICATIONS

Third Generation Partnership Project, "Technical Specification Group Radio Access Network; Physical layer procedures (FDD) (Release 6)," 3GPP TS 25.214 V6.11.0 (Dec. 2006).

Third Generation Partnership Project, "Technical Specification Group Radio Access Network; Physical layer procedures (FDD) (Release 6)," 3GPP TS 25.214 V6.7.1 (Dec. 2005).

Third Generation Partnership Project, "Technical Specification Group Radio Access Network; Physical layer procedures (FDD) (Release 5)," 3GPP TS 25.214 V5.11.0 (Jun. 2005).

Third Generation Partnership Project, "Technical Specification Group Radio Access Network; Medium Access Control (MAC) protocol specification (Release 7)," 3GPP TS 25.321 V7.3.0 (Dec. 2006).

Third Generation Partnership Project, "Technical Specification Group Radio Access Network; Medium Access Control (MAC) protocol specification (Release 6)," 3GPP TS 25.321 V6.11.0 (Dec. 2006).

Third Generation Partnership Project, "Technical Specification Group Radio Access Network; Medium Access Control (MAC) protocol specification (Release 5)," 3GPP TS 25.321 V5.12.0 (Sep. 2005).

Third Generation Partnership Project, "Technical Specification Group Radio Access Network; Medium Access Control (MAC) protocol specification (Release 6)," 3GPP TS 25.321 V6.7.0 (Dec. 2005).

Third Generation Partnership Project, "Technical Specification Group Radio Access Network; MAC protocol specification (Release 5)," 3GPP TS 25.321 V5.0.0 (Mar. 2002).

Zheng et al., *Multiple ARQ Processes for MIMO Systems*, EURASIP Journal on Applied Signal Processing, vol. 5, pp. 772-782, XP002347853, (May 2004).

Phillips, "HS-SCCH signalling for Rel-7 FDD MIMO scheme," 3GPP TSG RAN WG1 Meeting #46, R1-061953, Tallinn, Estonia (Aug. 28-Sep. 1, 2006).

Ericsson et al., "Revised Text Proposal on Multiplexing Method of L1/L2 Control Signaling in Uplink Single-Carrier FDMA Radio Access," TSG-RAN WG1 #43, R1-051570, Seoul, Korea (Nov. 7-11, 2005).

Ericsson et al., "Revised Text Proposal on Multiplexing Method of L1/L2 Signaling in Uplink Single-Carrier FDMA Radio Access," TSG-RAN WG1 #43, R1-051306, Seoul, Korea (Nov. 7-11, 2005).

Huawei, "Further considerations on multiplexing method of shared Control Channel in Uplink Single-Carrier FDMA," TSG-RAN WG1 #43, R1-051430, Seoul, Korea (Nov. 7-11, 2005).

Samsung, "Data and Control Multiplexing in DFT-S-OFDM," 3GPP TSG RAN WG1 Meeting #42bis, R1-051039, San Diego, USA (Oct. 10-14, 2005).

Third Generation Partnership Project, "Technical Specification Group Radio Access Network; Physical Layer Aspects for Evolved UTRA (Release 7)," 3GPP TR 25.814 V1.0.1 (Nov. 2005).

Third Generation Partnership Project, "Technical Specification Group Radio Access Network; Physical layer aspects for evolved Universal Terrestrial Radio Access (UTRA) (Release 7)," 3GPP TR 25.814 V7.1.0 (Sep. 2006).

Third Generation Partnership Project, "Technical Specification Group Radio Access Network; Multiplexing and channel coding (FDD) (Release 6)," 3GPP TS 25.212 V6.2.0 (Jun. 2004).

Samsung, "Downlink Pilot and Control Channel Structure for EUTRA," 3GPP TSG RAN WG1 Meeting #43, R1-051344, Seoul, Korea (Nov. 7-11, 2005).

* cited by examiner

METHOD AND SYSTEM FOR SUPPORTING MULTIPLE HYBRID AUTOMATIC REPEAT REQUEST PROCESSES PER TRANSMISSION TIME INTERVAL

CROSS REFERENCE TO RELATED APPLICATIONS

This application is a continuation of U.S. patent application Ser. No. 14/082,986, filed Nov. 18, 2013, which issued on Aug. 26, 2014 as U.S. Pat. No. 8,819,514, which is a continuation of U.S. patent application Ser. No. 13/735,515, filed Jan. 7, 2013, which issued on Nov. 19, 2013 as U.S. Pat. No. 8,589,753, which is a continuation of U.S. patent application Ser. No. 13/309,713, filed Dec. 2, 2011, which issued on Jan. 8, 2013 as U.S. Pat. No. 8,352,824, which is a continuation of U.S. patent application Ser. No. 11/670,202, filed Feb. 1, 2007, which issued on Dec. 6, 2011 as U.S. Pat. No. 8,074,137, which claims the benefit of U.S. Provisional Application Nos. 60/839,462 filed Aug. 23, 2006 and 60/765,076 filed Feb. 3, 2006, the contents of which are hereby incorporated by reference.

FIELD OF INVENTION

The present invention is related to wireless communication systems. More particularly, the present invention is related to a method and system for supporting multiple hybrid automatic repeat request (H-ARQ) processes per transmission time interval (TTI).

BACKGROUND

The third generation partnership project (3GPP) is currently considering a long term evolution (LTE) of the 3GPP to provide a new radio access network for a high-data-rate, low-latency, packet-optimized, improved system with high capacity and better coverage. The LTE is an evolution of the radio interface, (i.e., evolved universal terrestrial radio access (UTRA)), and the radio network architecture, (i.e., evolved universal terrestrial radio access network (UTRAN)). Currently, orthogonal frequency division multiple access (OFDMA) and single carrier frequency division multiple access (SC-FDMA) are proposed as air interface technologies to be used in the downlink and uplink transmissions respectively.

Meanwhile, 3GPP high speed packet access evolution (HSPA+) is also being proposed to improve the 3GPP radio access network capacity and coverage. In HSPA+, an evolution of the radio interface and the radio network architecture is being considered. In HSPA+, the air interface technology will still be based on code division multiple access (CDMA), but with a more efficient physical layer architecture including independent channelization codes, (distinguished with respect to channel quality), and multiple-input multiple-output (MIMO).

H-ARQ has been adopted by several wireless communication standards including 3GPP and 3GPP2. Besides the radio link control (RLC) layer's automatic repeat request (ARQ) function, H-ARQ provides improved throughput and performance with respect to link adaptation errors and rate control. Asynchronous H-ARQ is used in high speed downlink packet access (HSDPA) and synchronous H-ARQ is used in high speed uplink packet access (HSUPA).

The conventional H-ARQ scheme is a single H-ARQ scheme in which a transmitter transmits only one transport block (TB) per TTI via one H-ARQ process. With the introduction of physical resource dependent link adaptation mechanism in LTE or HSPA+, the conventional H-ARQ signaling mechanism, (i.e., signaling mechanism for single H-ARQ), is not sufficient for transmitting multiple TBs per TTI via multiple H-ARQ processes.

Therefore, it would be desirable to provide a method and system for supporting multiple H-ARQ processes for transmitting multiple TBs simultaneously per TTI.

SUMMARY

A method and apparatus may be used for supporting multiple H-ARQ processes per TTI. A transmitter and a receiver may include a plurality of H-ARQ processes. Each H-ARQ process may transmit and receive one TB per TTI. The transmitter may generate a plurality of TBs and assign each TB to a H-ARQ process. The transmitter may send control information for each TB, which may include H-ARQ information associated TBs with the TBs. The transmitter may send the TBs using the associated H-ARQ processes simultaneously per TTI. After receiving the TBs, the receiver may send feedback for each of the H-ARQ processes and associated TBs indicating successful or unsuccessful receipt of each of the TBs to the transmitter. The feedback for multiple TBs may be combined for the simultaneously transmitted H-ARQ processes, (i.e., TBs). The control information and the feedback may be sent via a layer 1 control part or layer 2 or layer 3 signaling. When MIMO is implemented, one H-ARQ process may be associated with one MIMO stream, or codeword. The feedback may include a channel quality indicator (CQI) per MIMO stream or codeword.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The present invention is applicable to any wireless communication system including, but not limited to, LTE and HSPA+ of the 3GPP standard.

Figure 1:
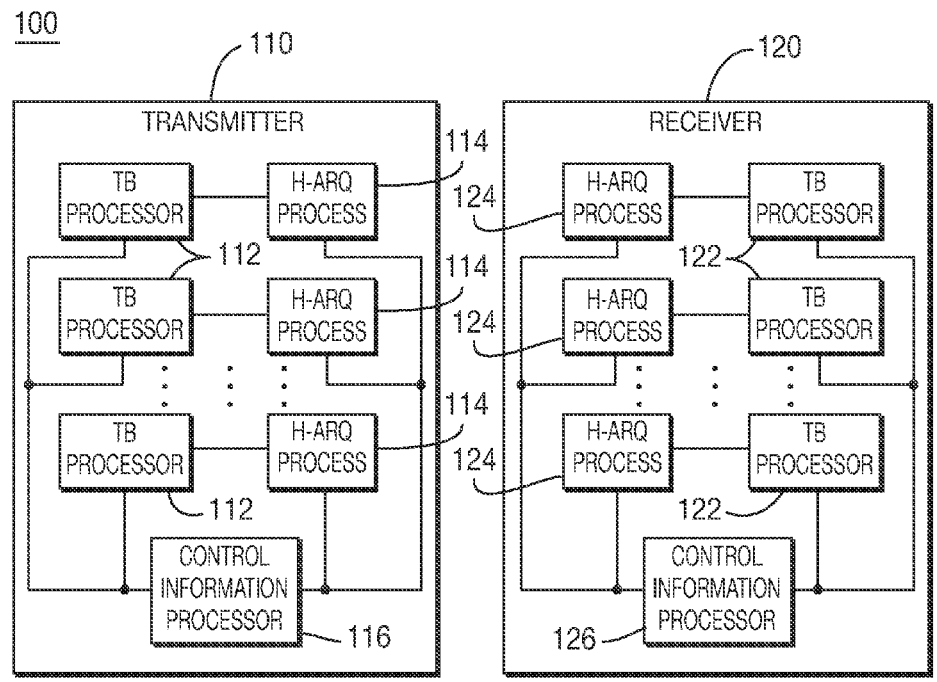
FIG. 1 is a block diagram of a system supporting multiple H-ARQ processes per TTI in accordance with the present invention.

FIG. 1 is a block diagram of a system 100 in accordance with the present invention. The system 100 includes a transmitter 110 and a receiver 120. The transmitter 110 and the receiver 120 may be a wireless transmit/receive unit (WTRU) and a Node-B, or vice versa. The terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. The terminology "base station" includes but is not limited to a Node-B, a site controller, an access point (AP), or any other type of interfacing device capable of operating in a wireless environment.

The transmitter 110 includes a plurality of TB processors 112, a plurality of H-ARQ processes 114 and a control information processor 116. Each TB processor 112 receives at least one data flow, (for example, at least one flow of medium access control (MAC) or RLC packet data units (PDUs)), and generates at least one TB. Multiple MAC or RLC PDUs may be multiplexed into one TB. In accordance with the present invention, multiple TBs may be transmitted simultaneously per TTI using multiple H-ARQ processes. The TB processor 112 selects a proper transport format combination (TFC), (i.e., TB size, TB set size, TTI, modulation and coding scheme (MCS), subcarriers, antenna beams, precoding matrix indication (PMI), cyclic redundancy check (CRC) size, redundancy version (RV), data block to radio resource mapping, or the like), for each of the TBs based on the link condition between the transmitter 110 and the receiver 120. Preferably, a separate CRC is attached to each TB. Multiple TBs are then transmitted simultaneously via multiple H-ARQ processes 114 per TTI.

The transmitter 110 assigns each of the TBs to a particular H-ARQ process and transmits multiple TBs via the assigned H-ARQ processes simultaneously per TTI. For example, when several independent spatial data streams, (i.e., several TBs), are transmitted simultaneously using MIMO, one H-ARQ process may be assigned to each spatial data stream, (i.e., one TB), and the multiple spatial data streams may be transmitted simultaneously via multiple H-ARQ processes.

The control information processor 116 is configured to send control information regarding the TBs and the H-ARQ processes associated with the TBs to the receiver 120 for each TTI. The control information includes, but is not limited to, a transport format and resource indicators (TFRIs) and H-ARQ-related information. The TFRI includes, but is not limited to, information about the dynamic part of the TFC, (including TB set size and modulation and coding scheme) and physical channel information, (i.e., channelization codes, subcarriers and antenna beams onto which the TBs are mapped in the corresponding TTI). The H-ARQ information includes, but is not limited to, an H-ARQ process ID, an H-ARQ function ID and a redundancy version. The control information may include rate matching parameters for each TB. Rate matching parameters for each TB may be derived from the TFRI.

The receiver 120 includes a plurality of TB processors 122, a plurality of H-ARQ processes 124 and a control information processor 126. The control information processor 126 processes control information received from the transmitter 110. Each H-ARQ process 124 processes one TB per TTI so that multiple TBs may be processed simultaneously per TTI based on the control information received from the transmitter 110. The H-ARQ process 124, (or the control information processor 126), sends feedback to the transmitter 110 indicating successful or unsuccessful receipt of each of the TBs, so that the transmitter 110 may retransmit failed TBs based on the feedback. The TB processors 122 process successfully received TBs based on the control information.

The feedback for multiple TBs may be combined for the simultaneous transmission of H-ARQ processes, (i.e., TBs). The control information and the feedback may be sent via a layer 1 control part or layer 2 or layer 3 signaling. When MIMO is implemented, the feedback may include a CQI per MIMO stream, or codeword.

Figure 2:
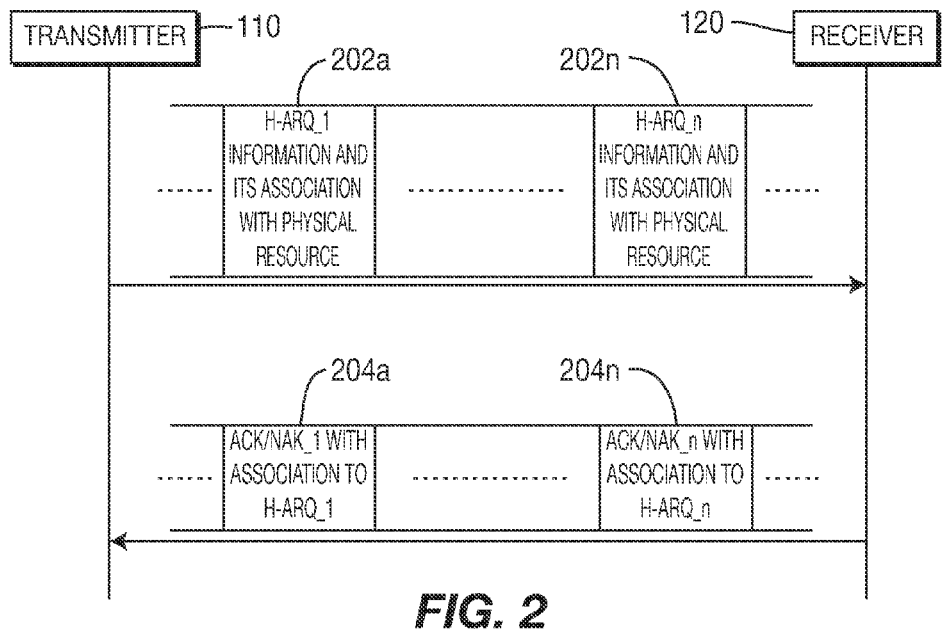
FIG. 2 shows transmission of associated control information for supporting simultaneous multiple H-ARQ processes and transmission of multiple TBs per TTI in accordance with the present invention.

FIG. 2 shows transmission of associated control information for supporting simultaneous multiple H-ARQ processes and transmission of multiple TBs per TTI in accordance with the present invention. The transmitter 110 sends a set of control information 202a-202n for the set of TBs transmitted in a common TTI to the receiver 120. The control information 202a-202n for the simultaneous H-ARQ transmissions may be concatenated into a single packet.

The control information 202a-202n includes information associating each control information 202a-202n with a corresponding TB. In a conventional wireless communication system, (i.e., HSDPA and HSUPA), control information for only one TB is transmitted through a separate control channel per TTI, (i.e., a high speed shared control channel (HS-SCCH) in HSDPA and an enhanced dedicated physical control channel (E-DPCCH) in HSUPA), and since only one TB is transmitted per TTI, there is an implicit association between the transmitted TB and the related control information. However, in accordance with the present invention, since multiple TBs are transmitted simultaneously in one TTI through multiple H-ARQ processes, the control information 202a-202n should include association information relating each control information 202a-202n to its associated TB. With the association information, the receiver 220 unambiguously knows which control information 202a-202n is for which TB so that the receiver 220 can use the right control information 202a-202n for processing of each TB.

Figure 3:
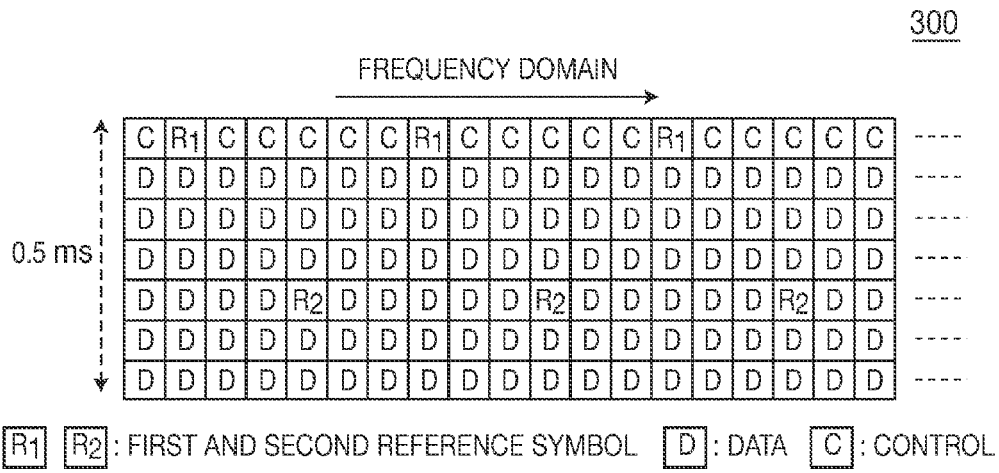
FIG. 3 shows an LTE downlink physical layer frame structure of data and associated control information.

The control information may be transmitted via a layer 1 control part of one TTI or layer 2 or layer 3 signaling. FIG. 3 shows an LTE downlink physical layer subframe 300 for data and associated control information. The subframe 300 includes a data part, (denoted as "D"), and a control part, (denoted as "C"). The control information may be included in the control part of the subframe 300. The downlink layer 1 frame structure for HSPA+ will be based on CDMA technology which may include independent channelization-codes (distinguished with regard to channel quality) and MIMO. With variable TTI, the control part may contain control information for data block mapped onto several subframes. When MIMO is used, the control information may also contain the allocation of spatial streams or codewords of different data blocks mapped to different H-ARQ functions per TTI.

Upon reception of the TBs, the receiver 120 sends separate feedback, (i.e., a positive acknowledgement (ACK) or a negative acknowledgement (NACK)), for each of the TBs. FIG. 2 also shows transmission of feedback 204a-204n for supporting multiple H-ARQ processes per TTI in accordance with the present invention. Since multiple feedback transmission 204a-204n is done for different H-ARQ processes from the receiver 120 to the transmitter 110, the transmitter 110 will know which feedback is for which H-ARQ process, (i.e., TB). For this association, an H-ARQ process ID, (or any other association information), may be included in each feedback 204a-204n to indicate the corresponding H-ARQ process.

Alternatively, if a pre-defined pattern or sequence of TBs associated with H-ARQ processes can be maintained and guaranteed by the transmitter 110 and the receiver 120, the feedback 204a-204n may be sent according to the pre-defined pattern or sequence so that the transmitter 110 knows which feedback corresponds to which H-ARQ process. For example, the feedback may be arranged in either ascending or descending order with respect to H-ARQ IDs associated with the feedback. This may be determined during the call setup. Alternatively, if a TB is successfully received by the receiver 120, the position for that TB's feedback may be filled with a dummy packet with a known pattern so that the transmitter 110 may recognize the successful receipt of the TB when the transmitter 110 decodes the feedback packet.

The feedback 204a-204n may be concatenated into a single packet for multiple H-ARQ processes, (i.e., multiple TBs).

The number of feedback, (i.e., the number of ACKs and NACKs), concatenated into a single feedback packet is dependent on the number of H-ARQ processes used for transmission of the TBs. When the number of feedback increases, a more robust MCS, subcarriers, antenna beams, codewords, or higher transmission power may be used for transmission of the concatenated feedback packet. Due to the importance of this feedback packet, a CRC may be attached to the concatenated feedback packet to improve the error detection at the transmitter 110.

Figure 4:
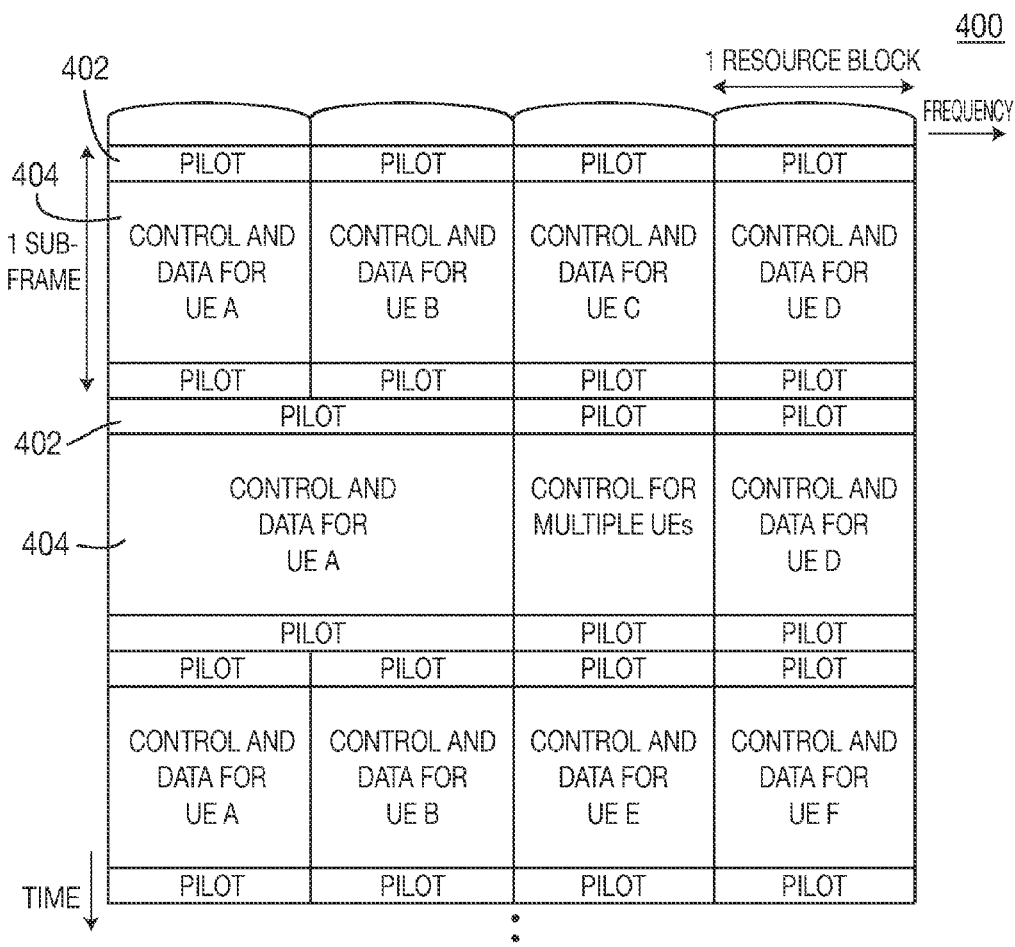
FIG. 4 shows an LTE uplink physical layer frame structure for data and associated control information.

The feedback may be included in the control part of the physical layer frame. FIG. 4 shows an LTE uplink physical layer subframe 400 structure. The subframe 400 includes a pilot part 402 and a control and data part 404. The feedback may be included in the control and data part 404 of the subframe 400.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
    circuitry configured to receive a long term evolution (LTE) physical layer subframe over an orthogonal frequency division multiplexing (OFDM) signal that includes a plurality of OFDM symbols, each OFDM symbol comprising a plurality of frequency sub-carriers, wherein the LTE physical layer subframe includes a data part and an associated control part, and reference signals interspersed on sub-carriers among the control part and the data part;
    wherein the control part includes at least a first OFDM symbol of the plurality of OFDM symbols and carries control information for each transport block (TB) of a plurality of TBs;
    wherein the control information includes for each TB a modulation and coding scheme (MCS) and HARQ information; wherein the HARQ information for each TB includes a redundancy version;
    wherein the data part includes other OFDM symbols of the plurality of OFDM symbols and carries the plurality of TBs and a cyclic redundancy check (CRC) for each TB; and
    circuitry configured to utilize the control information to process the plurality of TBs.

2. The WTRU of claim 1, wherein the LTE physical layer subframe is received in one transmission time interval (TTI).

3. The WTRU of claim 2, wherein the TTI is a variable length TTI.

4. The WTRU of claim 1 wherein the data part does not include the first OFDM symbol.

5. The WTRU of claim 1 wherein the control part includes control information associated with at least one other WTRU, and the data part includes data that is associated with the control information associated with the at least one other WTRU.

6. The WTRU of claim 1 wherein the control information is associated with at least one other WTRU.

7. The WTRU of claim 1, wherein the plurality of OFDM symbols is 7 OFDM symbols.

8. The WTRU of claim 1, wherein the LTE physical layer subframe is 0.5 ms long.

9. The WTRU of claim 1, wherein the control part includes an allocation for each TB of the plurality of TBs to a different spatial stream.

10. The WTRU of claim 1 further comprising: circuitry configured to transmit an uplink message including HARQ feedback information for each of the plurality of TBs.

11. The WTRU of claim 10, wherein the uplink message further includes channel quality indicator information.

12. The WTRU of claim 10 further comprising circuitry configured to, based on the amount of feedback, select a coding scheme and determine whether to include a cyclic redundancy check (CRC) with the uplink message.

13. The WTRU of claim 10 further comprising:
    circuitry configured to, based on the amount of feedback, select a more robust coding scheme for the uplink message.

14. The WTRU of claim 13, further comprising: including a cyclic redundancy check (CRC) with the uplink message.

15. The WTRU of claim 1 further comprising:
    circuitry configured to produce an acknowledgement feedback for each received TB and on a condition that the WTRU is assigned at least one resource block to transmit control and data in a subframe, to transmit the acknowledgement feedback for both transport blocks in the assigned at least one resource block, wherein on a condition that the WTRU is not assigned at least one resource block to transmit control and data in the subframe, to transmit the acknowledgement feedback for both TBs in a resource block for use in transmitting control information for a plurality of WTRUs.

16. The WTRU of claim 15, wherein the acknowledgement feedback for each received TB is concatenated.

17. The WTRU of claim 15, wherein the acknowledgement feedback is transmitted with channel quality indicator feedback.

18. The WTRU of claim 1, wherein the first OFDM symbol is the first OFDM symbol in time in the LTE physical layer subframe.

19. The WTRU of claim 1, wherein the control information for each TB is concatenated.

20. A base station comprising:
a transmitter configured to transmit a long term evolution (LTE) physical layer subframe over an orthogonal frequency division multiplexing (OFDM) signal that includes a plurality of OFDM symbols, each OFDM symbol comprising a plurality of frequency sub-carriers, wherein the LTE physical layer subframe includes a data part and an associated control part, and reference signals interspersed on sub-carriers among the control part and the data part;
wherein the control part includes at least a first OFDM symbol of the plurality of OFDM symbols and carries control information for each transport block (TB) of a plurality of TBs;
wherein the control information includes for each TB a modulation and coding scheme (MCS) and HARQ information; wherein the HARQ information for each TB includes a redundancy version;
wherein the data part includes other OFDM symbols of the plurality of OFDM symbols and carries the plurality of TBs and a cyclic redundancy check (CRC) for each TB;
wherein each TB of the plurality of TBs is formatted according to the control information.

21. The base station of claim 20, wherein the LTE physical layer subframe is transmitted in one transmission time interval (TTI).

22. The base station of claim 21, wherein the TTI is a variable length TTI.

23. The base station of claim 20, wherein the data part does not include the first OFDM symbol.

24. The base station of claim 20, wherein the control part includes control information for each of at least two wireless transmit receive units (WTRUs), and the data part includes data that is associated with the control information for each of the at least two WTRUs.

25. The base station of claim 20, wherein the control part includes control information for at least two WTRUs.

26. The base station of claim 20, wherein the plurality of OFDM symbols is 7 OFDM symbols.

27. The base station of claim 20, wherein the LTE physical layer subframe is 0.5 ms long.

28. The base station of claim 20, wherein the control part includes an allocation for each TB of the plurality of TBs to a different spatial stream.

29. The base station of claim 20, further comprising: a receiver configured to receive an uplink message including HARQ feedback information for each of the plurality of TBs.

30. The base station of claim 29, wherein the uplink message further includes channel quality indicator information.

31. The base station of claim 20 further comprising: a receiver configured to receive acknowledgement feedback for both transport blocks in an assigned at least one resource block, on a condition that a wireless transmit receive unit (WTRU) is assigned at least one resource block to transmit control and data in a subframe, and to receive the acknowledgement feedback for both TBs in a resource block for use in receiving control information for a plurality of WTRUs, on a condition that the WTRU is not assigned at least one resource block to transmit control and data in the LTE physical layer subframe.

32. The base station of claim 31, wherein the acknowledgement feedback for each TB is concatenated.

33. The base station of claim 31, wherein the acknowledgement feedback is received with channel quality indicator feedback.

34. The base station of claim 20, wherein the first OFDM symbol is the first OFDM symbol in time in the LTE physical layer subframe.

35. The base station of claim 20, wherein the control information for each TB is concatenated.

36. A method performed by a wireless transmit/receive unit (WTRU), the method comprising:
receiving a long term evolution (LTE) physical layer subframe over an orthogonal frequency division multiplexing (OFDM) signal that includes a plurality of OFDM symbols, each OFDM symbol comprising a plurality of frequency sub-carriers, wherein the LTE physical layer subframe includes a data part and an associated control part, and reference signals interspersed on sub-carriers among the control part and the data part;
wherein the control part includes at least a first OFDM symbol of the plurality of OFDM symbols and carries control information for each transport block (TB) of a plurality of TBs;
wherein the control information includes for each TB a modulation and coding scheme (MCS) and HARQ information; wherein the HARQ information for each TB includes a redundancy version;
wherein the data part includes other OFDM symbols of the plurality of OFDM symbols and carries the plurality of TBs and a cyclic redundancy check (CRC) for each TB; and
utilizing the control information to process the plurality of TBs.

37. The method of claim 36, wherein the LTE physical layer subframe is received in one transmission time interval (TTI).

38. The method of claim 36 wherein the data part does not include the first OFDM symbol.

39. The method of claim 36, wherein the control part includes control information associated with at least one other WTRU, and the data part includes data that is associated with the control information associated with the at least one other WTRU.

40. The method of claim 36, wherein the control information is associated with at least one other WTRU.

41. The method of claim 37, wherein the TTI is a variable length TTI.

42. The method of claim 36, wherein the plurality of OFDM symbols is 7 OFDM symbols.

43. The method of claim 36, wherein the LTE physical layer subframe is 0.5 ms long.

44. The method of claim 36, wherein the control part includes an allocation for each TB of the plurality of TBs to a different spatial stream.

45. The method of claim 36 further comprising:
transmitting an uplink message including HARQ feedback information for each of the plurality of TBs.

46. The method of claim 45, wherein the uplink message further includes channel quality indicator information.

47. The method of claim 45 further comprising, based on the amount of feedback, select a coding scheme and determine whether to include a cyclic redundancy check (CRC) with the uplink message.

48. The method of claim 45 further comprising:
based on the amount of feedback, selecting a more robust coding scheme for the uplink message.

49. The method of claim 48 further comprising: including a cyclic redundancy check (CRC) with the uplink message.

50. The method of claim 36, further comprising: producing an acknowledgement feedback for each received TB and on a condition that the WTRU is assigned at least one resource block to transmit control and data in a subframe, transmitting the acknowledgement feedback for both transport blocks in the assigned at least one resource block, wherein on a condition that the WTRU is not assigned at least one resource block to transmit control and data in the subframe, transmitting the acknowledgement feedback for both TBs in a resource block for use in transmitting control information for a plurality of WTRUs.

51. The method of claim 50, wherein the acknowledgement feedback for each received TB is concatenated.

52. The method of claim 50, wherein the acknowledgement feedback is transmitted with channel quality indicator feedback.

53. The method of claim 36, wherein the first OFDM symbol is the first OFDM symbol in time in the LTE physical layer subframe.

54. The method of claim 36, wherein the control information for each TB is concatenated.

55. A method performed in a network node, the method comprising:
  transmitting a long term evolution (LTE) physical layer subframe over an orthogonal frequency division multiplexing (OFDM) signal that includes a plurality of OFDM symbols, each OFDM symbol comprising a plurality of frequency sub-carriers, wherein the LTE physical layer subframe includes a data part and an associated control part, and reference signals interspersed on sub-carriers among the control part and the data part;
  wherein the control part includes at least a first OFDM symbol of the plurality of OFDM symbols and carries control information for each transport block (TB) of a plurality of TBs;
  wherein the control information includes for each TB a modulation and coding scheme (MCS) and HARQ information; wherein the HARQ information for each TB includes a redundancy version;
  wherein the data part includes other OFDM symbols of the plurality of OFDM symbols and carries the plurality of TBs and a cyclic redundancy check (CRC) for each TB;
  wherein each TB of the plurality of TBs is formatted according to the control information.

56. The method of claim 55, wherein the LTE physical layer subframe is received in one transmission time interval (TTI).

57. The method of claim 56, wherein the TTI is a variable length TTI.

58. The method of claim 55, wherein the data part does not include the first OFDM symbol.

59. The method of claim 55, wherein the control part includes control information for each of at least two wireless transmit receive units (WTRUs), and the data part includes data that is associated with the control information for each of the at least two WTRUs.

60. The method of claim 55, wherein the control part includes control information for at least two WTRUs.

61. The method of claim 55, wherein the plurality of OFDM symbols is 7 OFDM symbols.

62. The method of claim 55, wherein the LTE physical layer subframe is 0.5 ms long.

63. The method of claim 55, wherein the control part includes an allocation for each TB of the plurality of TBs to a different spatial stream.

64. The method of claim 55, further comprising: receiving an uplink message including HARQ feedback information for each of the plurality of TBs.

65. The method of claim 62, wherein the uplink message further includes channel quality indicator information.

66. The method of claim 55, further comprising: on a condition that a wireless transmit receive unit (WTRU) is assigned at least one resource block to transmit control and data in a subframe, receiving an acknowledgement feedback for each transport block in the assigned at least one resource block, and on a condition that the WTRU is not assigned at least one resource block to transmit control and data in the LTE physical layer subframe, receiving an acknowledgement feedback for each of the TBs in a resource block for use in receiving control information for a plurality of WTRUs.

67. The method of claim 66, wherein the acknowledgement feedback for each TB is concatenated.

68. The method of claim 66, wherein the acknowledgement feedback is received with channel quality indicator feedback.

69. The method of claim 55, wherein the first OFDM symbol is the first OFDM symbol in time in the LTE physical layer subframe.

70. The method of claim 55, wherein the control information for each TB is concatenated.

* * * * *